United States Patent [19]

Rybeck

[11] Patent Number: 4,560,194
[45] Date of Patent: Dec. 24, 1985

[54] BLADE AND TOOL FOR ITS USE IN HANDLING MATERIAL, SUCH AS LOGS

[76] Inventor: Torsten A. Rybeck, N62W28344 Rybeck Rd., Hartland, Wis. 53029

[21] Appl. No.: 596,841

[22] Filed: Apr. 4, 1984

[51] Int. Cl.⁴ .............................................. B65G 7/12
[52] U.S. Cl. ........................................ 294/61; 7/161; 125/43; 294/17; 294/26
[58] Field of Search ................. 294/2, 15, 14, 17, 24, 294/26, 50.6, 51, 61, 120, 126; 7/104, 144, 145, 158, 159, 161, 166; 30/314, 318; 125/42, 43; D8/7, 12, 76

[56] References Cited

U.S. PATENT DOCUMENTS

| | | | |
|---|---|---|---|
| D. 29,975 | 1/1899 | Bourgeois | D8/12 |
| D. 35,720 | 2/1902 | David et al. | 7/161 X |
| D. 166,408 | 4/1952 | Oake | 294/26 X |
| D. 203,575 | 1/1966 | Dobbs | 7/159 X |
| 1,701,493 | 2/1929 | Allen | 7/159 |
| 2,864,643 | 12/1958 | Juntunen | 294/61 |
| 2,883,229 | 4/1959 | Juntunen | 294/17 |
| 3,856,341 | 12/1974 | Florek | 294/26 X |

FOREIGN PATENT DOCUMENTS 23610  12/1907  Sweden .............................. 294/17

Primary Examiner—Johnny D. Cherry
Attorney, Agent, or Firm—Schwartz, Jeffery, Schwaab, Mack, Blumenthal & Evans

[57] ABSTRACT

A blade is disclosed which can be stably anchored in an object, yet readily removed therefrom with a minimum of strain and without the need for an auxiliary tool. Also disclosed is a tool comprising the blade and a handle member. This tool is especially well suited for handling firewood, e.g., during cutting, hauling, stacking, and splitting.

21 Claims, 7 Drawing Figures

BLADE AND TOOL FOR ITS USE IN HANDLING MATERIAL, SUCH AS LOGS

BACKGROUND OF THE INVENTION

The present invention relates to a blade having a novel configuration which facilitates and stabilizes the anchoring of the blade when it is driven into a material, such as wood, while at the same time enhancing the ease with which the blade can intentionally be removed from an anchored position. The invention also relates to a tool using the blade for handling materials, especially logs and pieces of firewood to be split.

Various devices which are equipped with blades of different shapes and which include sharpened points are known to the art for moving, hoisting, or otherwise manipulating material brought into contact with the points or blade. For example, U.S. Pat. No. 2,883,229 discloses a pick-like tool, called a "pickaroon," which is used for rolling, prying, or sliding pulpwood and logs into which the pickaroon's single sharpened point has been driven. A similar tool is disclosed in U.S. Pat. No. 1,571,062.

The aforementioned devices, including the pickaroon and similar tools, generally suffer from the drawback that, once anchored in an object, they can be removed only with considerable effort, often requiring the use of an auxiliary tool, like a hammer, to dislodge the point or blade of the device from its anchored position.

The present invention is particularly adapted to facilitate the handling of firewood, for example, firewood which has been sawed into short lengths and must be handled by the supplier and/or ultimate user for various reasons, such as loading, unloading, stacking, carrying or the like. Typically, these pieces of firewood must be split, and this requires intensive bending-over, lifting from the ground and handling of not only the original unsplit piece of wood, but also two or more split pieces derived therefrom. Typically this work is carried out in an environment in which the logs are snow-covered, wet and/or slippery. Cutting, splitting and supplying firewood have become significant areas of commerce once again in view of increased prices for fossil fuels. Wood has become the primary heating fuel for 2.5 million American homes. Accordingly, there is a real need for an improved tool which facilitates the handling of firewood by both suppliers as well as homeowners. Of course, such a tool would also greatly benefit linemen, road crews, loggers and others who must handle logs.

Pickaroon-type devices presently on the market do not satisfy this need. While they do enable one to pick up a piece of firewood without bending over, they do not allow effective manipulation of the log or piece of wood once it is grasped or spiked with the tool. Furthermore, the piece of wood cannot be readily deposited again once it is spiked. This usually requires considerable effort by the user and/or extensive manipulation of the tool handle. Often it is necessary to employ one's foot or a second tool to disengage the pickaroon from the piece of wood. This considerable inconvenience severely limits the usefulness of the existing devices.

U.S. Design Pat. No. 203,575 depicts what is labeled a "hook-ax," comprising a shaft whereon is mounted a blade which presents a cutting edge along its rear edge and an opposing elongated projection ending in a curved point. This represents a standard firefighting tool, used to break through doors, walls, roofs, etc. by firefighting personnel. It is not used for handling objects.

SUMMARY OF THE INVENTION

Accordingly, it is an object of the present invention to provide a blade which can be stably anchored in an object and yet readily removed therefrom, without undue effort or strain or the need for an auxiliary tool.

It is a further object of the present invention to provide a tool which can be used to manipulate logs and other objects without the previously discussed drawbacks of devices in the prior art.

It is a particular object of the invention to provide an improved tool for moving, lifting or otherwise manipulating objects, especially logs and/or pieces of firewood which are to be split.

Another object of the invention resides in providing a tool which enables one piece of wood to be lifted off the ground and placed under the user's arm, so that a second piece of wood can also be carried with the tool.

Still another object of the invention is to provide a tool which enables logs to be safely placed onto a wood splitting machine.

In accomplishing these objects, there has been provided, in accordance with one aspect of the invention, a pointed blade comprising at least one first edge which has a curved profile and which terminates at one end in a spiral-like projection along the length of which there is substantial convergence on a locus point. In one preferred embodiment, all radial lines angularly projectable from the locus point intersect the edge of the spiral-like projection at approximately the same angle.

There has been provided, in accordance with another aspect of the present invention, a tool comprising a generally pointed blade comprising at least one first edge which has a curved profile and which terminates at one end in a spiral projection along the length of which there is substantial convergence on a locus point, and a handle member substantially rigidly connected to the blade for transmitting a force to the edge of the blade which is opposite to the spiral-like projection. In accordance with still another aspect of the present invention, there has also been provided a tool as just described, further comprising a second curved edge which comprises a cutting edge along at least a portion of the length of the blade.

It is still another object of the present invention to provide a method for using the aforementioned blade to move an article such as a log. In accomplishing this object, there has been provided a method for manipulating an article, comprising the steps (a) of applying a first driving force to a blade, said blade comprising a generally flat blade portion which converges at one end to a sharp tip, said blade portion having a top edge which has a curved profile and which terminates at the tip of said blade in a spiral-like projection along the length of which there is substantial convergence on a locus point, to anchor at least said spiral-like projection of said blade in said object, (b) thereafter applying a lifting force to said blade such that said article is moved with said spiral-like projection remaining anchored in said article and, (c) after step (b) applying a third force to said blade, said third force being in a direction counter to said first driving force to dislodge said spiral-like projection from said article.

Other objects, features, and advantages of the present invention will become apparent from the detailed description given hereinafter. It should be understood however, that the detailed description and drawings, while indicating preferred embodiments of the invention, are given by way of illustration only, since various changes and modifications within the spirit and scope of the invention will become apparent to those skilled in the art from this detailed description.

DETAILED DESCRIPTION OF PREFERRED EMBODIMENTS

In one preferred embodiment, the present invention comprises a pointed blade having a curved outer edge which ends in a spiral projection along the length of which there is substantial convergence on a single locus point. A spiral projection thus described is to be distinguished from a curved projection which, in theory at least, may be considered a small segment of a much larger spiral projected in space through the curved projection. The pointed end of the blade is therefore characterized by having a curved configuration in which the radius of curvature becomes progressively smaller as the blade approaches its tip. In one preferred embodiment of the present invention, all angular radii projected from the locus point intersect the spiral at approximately the same angle, which can, for example, be 90°.

Figure 1:
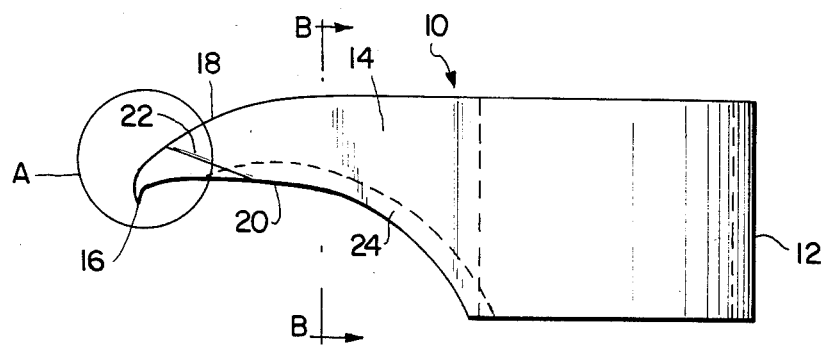
FIG. 1 is a side-view of a blade according to the invention.
Figure 2:
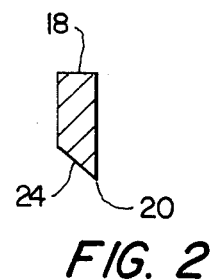
FIG. 2 is a cross-sectional view taken along line B—B in FIG. 1.
Figure 3:
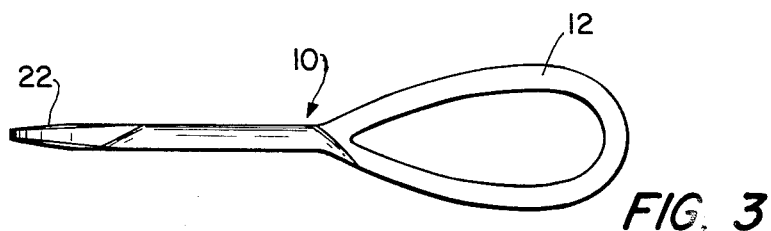
FIG. 3 is a top-view of one embodiment of the blade which presents a cutting edge along one of its edges.

Such a blade is illustrated in FIGS. 1 through 3 of th drawings. The blade 10 is comprised of a yoke portion 12, which is asdapted to fit about one end of a handle member, and a generally flat blade portion 14 integrally connected to or formed with the yoke portion. Blade portion 14 generally tapers to a pointed tip 16. Blade portion 14 tapers from its top edge 18 in the direction of its bottom edge 20, so that the back edge of the blade is wider than the bottom edge, in order to distribute the reactive force over a larger area when the tool is used, since wood is weak in compression. The blade also tapers from one or both sides in the region of its point, for example, beginning at line 22 and tapering to the narrower tip 16. This produces a double or compound taper in the region between line 22 and point 16. The top and bottom edges of the blade converge to a sharp tip, whereas the blade side(s) converge preferably to a finite width, i.e., the sharp tip has a wedge-shaped configuration. In a preferred embodiment, bottom edge 20 of blade portion 12 is bevelled to a sharp cutting edge 24, the usefulness of which will be discussed hereinbelow. Bottom edge 20 also generally curves in the direction of tip 16.

Figure 4:
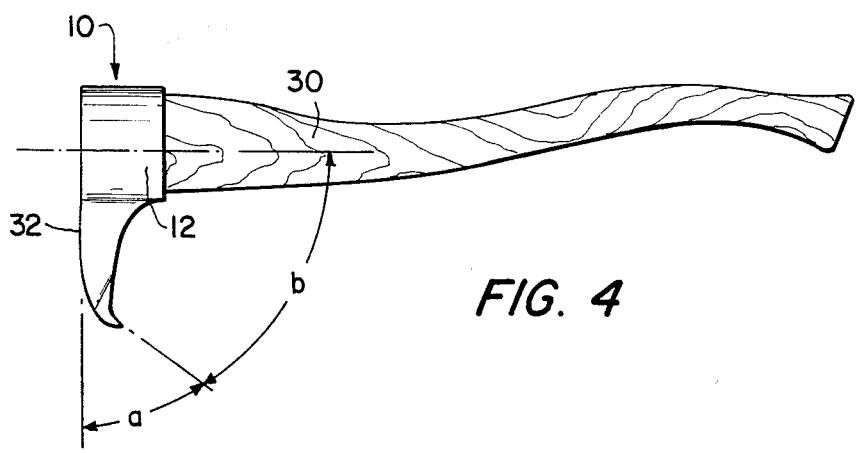
FIG. 4 is an illustration of a tool according to the present invention.

In FIG. 4 is illustrated one design of a tool utilizing the blade according to the invention. A handle member, 30, typically made of wood, is inserted into yoke portion 12 of the blade 10 and is rigidly fastened therein by a suitable means. This could be a bolt or pin passing through both members, or other suitable means of attachment, e.g., bonding with a hardenable resin material or a wedge element.

Figure 1A:
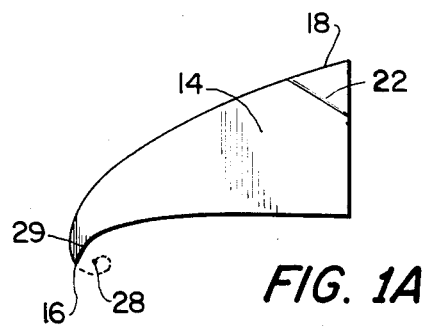
FIG. 1A is an enlargement of FIG. 1 at A, showing the point profile of the blade.

One essential feature of the blade member of the present invention is that the tip of the blade is curved inwardly toward the handle of the tool, in a shape which will easily penetrate wood, will remain tightly in the wood and can easily be withdrawn from the wood when desired. This shape can be better seen from FIG. 1A of the drawings, which is an enlargement of the tip portion of blade 10. The top edge 18 of blade portion 14 generally curves toward pointed end 16; however, this curvature of the blade tip has a special configuration along its final portion, e.g., the final ½ to 1 inch or more. This configuration can be characterized as being spiral-like or generally spiral shaped. This means that the radius of curvature becomes progressively smaller as the blade approaches its tip. Most preferably, the shape is that of a true spiral, or logarithmic spiral, wherein the curve always intersects the radii extending from the locus point at a fixed angle. In FIG. 1A, the tip 16 of the blade has been extended by a dashed line to show convergence at the locus point 28. The configuration of bottom edge 20 is not the same as that of top edge 18. It must be curved in such a way as to form an appropriately shaped point 16; however it has been found necessary, in order to obtain optimum performance of the tool, to provide a short, relatively straight section 29 immediately adjacent point 16. This straight section 29 has a length and an angular orientation which are selected to provide for the advantageous strength and performance properties achieved according to the present invention. If the straight section 29 (which is also flat on its underside) is too short, the point 16 will not penetrate properly. If it is too long, the point will be weakened so that the risk of failure increases. Similarly, the angles a and b (FIG. 4) must be properly selected. If angle a between the straight section 29 and the top edge 32 of the blade is too large, the point 16 will be weakened, whereas if it is too small, the point will not penetrate and hold properly. Angle a is preferably between 47° and 57° and angle b is preferably between about 33° and 43°. Preferably, angles a+b are equal to about 90°. In a preferred embodiment, the straight section 29 has a length of about 3/16 inch, angle a=52°, and angle b=38°.

The unique combination of curved edge having a spiral-like tip endows the claimed blade with a number of important advantages. For example, it has been surprisingly discovered that the tool according to the invention can be used to handle and manipulate logs and pieces of firewood with great ease and control. A piece of wood can be picked up by spiking or penetrating it with the tool, either at the outer circumference (e.g., bark surface) or at a sawed end. The piece of wood can be easily carried, and in fact, the force of its own weight actually causes the point of the tool to become more firmly embedded in the wood. Yet, the piece of wood can be released from the tool with the utmost ease, requiring only that the handle of the tool be rotated toward the piece of wood by a relatively small angle, e.g., about 30°. The point of the tool is immediately released from the wood, so that no auxilliary tool is needed to free the point. Usually, just setting a log on the ground or on a stack rotates the log enough to effect a release of the tool. In fact, release of the tool is so easy and reliable that it is even possible to toss a piece of firewood onto a stack, using the tool of the invention. Such a manipulation could never be carried out with the pickaroon devices of the prior art. Moreover, because of the ease of handling made possible by the present invention, the tool can be used to very efficiently and effortlessly position and hold pieces of firewood in a woodsplitting machine. This is not only convenient but also provides an important element of safety, since the operator does not have to place his hands into the machine.

These advantageous characteristics of the present tool are not fully understood. Although not intending to be bound thereby, it is believed that a force applied to embed the blade's spiral projection in a material, such as wood, will normally have a component, or resultant force, which is directed along a vector oriented toward the locus point of the spiral, the vector in effect following the path of one of the angular radii projectable from the locus point. The concentration of the resultant force at the tip of the spiral projection effects a compacting of material in the region of the convergence point, thereby converting some of the applied force into potential energy stored in the deformation of the material. Thus, the material around the embedded projection is compressed, not torn or cut, and this provides for a greater pull-out strength. Furthermore, some of the stored energy is released when the compression is relieved, facilitating withdrawal of the projection from the material.

In accordance with the preferred embodiment of the present invention, wherein the tool is provided with a handle member substantially rigidly connected to the blade, the spiral projection of the tool's blade portion can be anchored in an object such as a log by applying force to the blade via the force-transmitting handle member and thereby driving the projection into the log. Rather than being sheared, the wood fibers of the log are compressed by the resultant force, which is concentrated at the end of the spiral projection. The wood thus compressed retains its holding strength and remains under tension until a force is applied to dislodge the blade from its anchored position, whereupon the potential energy stored in the deformed fibers is released, facilitating withdrawal.

Figure 5:
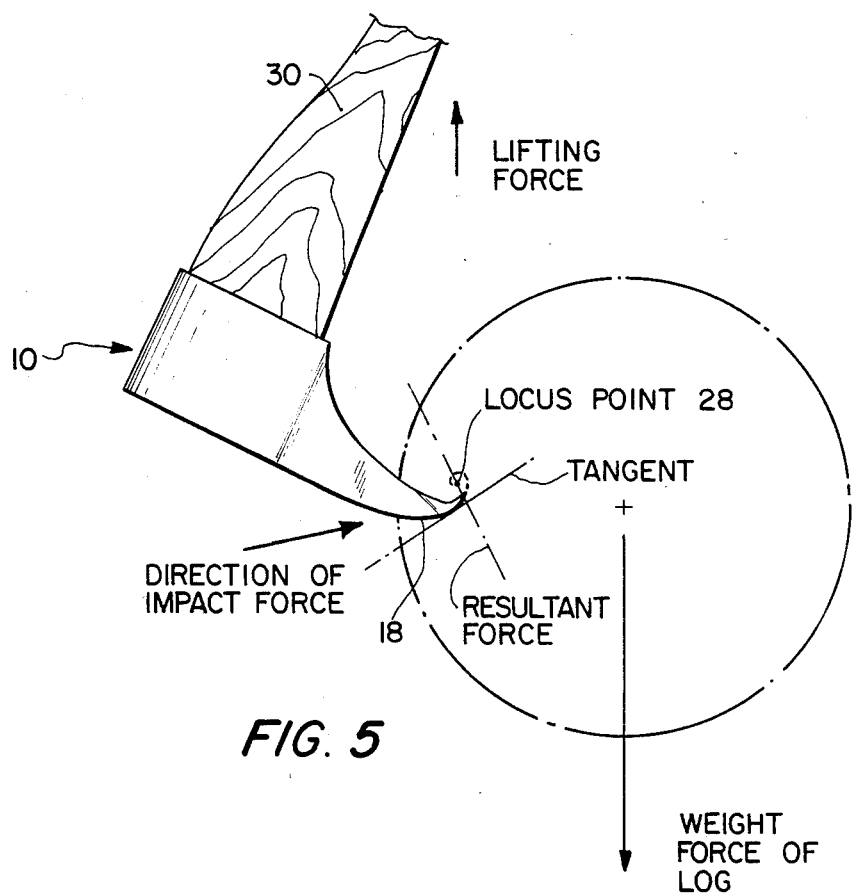
FIG. 5 is an illustration of the tool shown in FIG. 4 in use.
Figure 6:
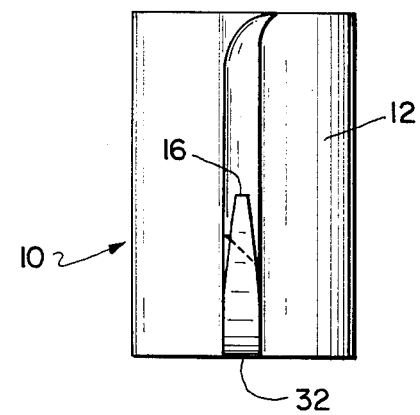
FIG. 6 is a front end view of the tool shown in FIG. 5.

FIG. 5 depicts the aforementioned tool after its point has been driven into the side of a log, with the driving and resultant forces also being indicated. Upon application of a lifting force to the handle as shown in FIG. 5, the blade portion of the tool tends to rotate about the locus point of the spiral projection, thereby driving the projection more firmly into its anchored position. Conversely, the inertial reaction of the object against the rotational tendency of the blade portion is manifested as a resultant force applied to the embedded portion of the blade's curved border. As previously explained, the reactive force will be concentrated at the locus point of the spiral, further stabilizing the blade's projection in the object. Consequently, the greater the lifting force on the handle, the more firmly the projection is embedded into the object.

But suprisingly, the embedded blade can still be removed with relative ease by rotating the handle in a direction counter to the direction of the lifting force (downward in FIG. 5). This counterrotation of the handle immediately releases the outer edge of the embedded blade portion at all points along the blade's curved edge 18, which in turn releases the potential energy stored in the deformation of material around the projection. As previously described, withdrawal is thus effected without need of a hammer or other auxiliary tool.

In another preferred embodiment of the present invention, a tool is provided wherein the handle and blade form an angle of approximately 90° and, in addition, the curved lower edge 20 of the blade comprises a cutting edge along at least a portion of the blade's length. This cutting edge serves two useful purposes. On the one hand, it can be employed to easily trim any small branches which might remain on sawed logs or pieces of firewood. The integral combination of spiral-shaped projection in close proximity with the cutting edge overcomes the disadvantage of having to continually change tools or shift the orientation of the blade in order to use the cutting edge. Thus, with a tool in accordance with the invention, one can anchor the point in an object, lift or slide the object without dislodging of the point, withdraw the point with relative ease, and trim the object using the cutting edge of the blade, all without shifting one's grip on the tool's handle. Several utilities are combined in a single lightweight tool, e.g., weighing from about 2–2½ pounds.

On the other hand, the sharpened cutting edge also interacts with the point of the tool during one important function of the tool. With the tool, it is possible to easily slide a sizable log along the ground, e.g., to the point where it will be sawed into shorter lengths. To do this, one embeds the point of the tool in the outer surface (bark) of the log near one end of the log and then causes the log to roll over upon the blade of the tool, so that the end of the log is lifted up off the ground by the tool blade (on top of it) as the handle of the tool is pulled to slide the log along the ground. When this occurs, the cutting edge cooperates with the tool point by cutting into the surface of the log in order to provide added stability and gripping power to pull the log.

What is claimed is:

1. A blade for use in a tool adapted to handle articles which are penetrated by the blade, comprising:
 a generally flat blade portion which converges at one end to form means, comprising a sharp tip portion, for penetrating an article and anchoring therein to enable lifting of the article and for enabling easy intentional release of the tip portion from the article, said tip portion having a top edge which has a curved profile terminating at the tip of said blade and having a radius of curvature which becomes progressively smaller in the direction approaching said tip, said top edge forming a portion of a spiral-like line which substantially converges on a locus point beyond said tip; and
 means integral with said blade portion for rigidly attaching the blade portion to a handle member.

2. A blade as defined in claim 1, wherein all radial lines angularly projectable from said locus point intersect said spiral-like line at approximately the same angle.

3. A blade as defined in claim 2, wherein said angle is about 90°.

4. A blade as defined in claim 1, wherein said blade portion further comprises a bottom edge which has a generally curved profile and includes a cutting edge along at least a portion of the length of said bottom edge.

5. A blade as defined in claim 1, wherein said blade portion comprises a bottom edge having a generally curved profile, said bottom edge including a straight portion which converges to form said sharp tip portion.

6. A blade as defined in claim 5, wherein the blade portion tapers from its top edge in the direction of its bottom edge, so that the top edge is wider than the bottom edge.

7. A blade as defined in claim 6, wherein the blade tapers from at least one side in the region of its tip portion, whereby a double taper is produced in the tip portion.

8. A blade as defined in claim 6, wherein both sides of the blade taper in said tip portion to produce a finite width, whereby the tip has a wedge-shaped configuration.

9. A blade as defined in claim 5, wherein both sides of the blade taper in said tip portion to produce a finite width, whereby the tip has a wedge-shaped configuration.

10. A tool comprising:
 a blade as defined in claim 1; and
 a handle member substantially rigidly connected to said blade for transmitting a force thereto.

11. A tool as defined in claim 10, wherein all radial lines angularly projectable from said locus point intersect said spiral-like line at approximately the same angle.

12. A tool as defined in claim 10, wherein said angle is about 90°.

13. A tool as defined in claim 10, wherein said handle member comprises an elongated handle, wherein the angle between the major axes of said blade and said handle is about 90°.

14. A tool as defined in claim 10, wherein said blade portion further comprises a bottom edge which has a generally curved profile and includes a cutting edge along at least a portion of the length of said bottom edge.

15. A tool as defined in claim 10, wherein said blade portion comprises a bottom edge having a generally curved profile, said bottom edge including a straight portion which converges to form said sharp tip portion.

16. A tool as defined in claim 15, wherein the blade portion tapers from its top edge in the direction of its bottom edge, so that the top edge is wider than the bottom edge.

17. A tool as defined in claim 16, wherein the blade tapers from at least one side in the region of its tip portion, whereby a double taper is produced in the tip portion.

18. A tool as defined in claim 16, wherein both sides of the blade taper in said tip portion to produce a finite width, whereby the tip has a wedge-shaped configuration.

19. A tool as defined in claim 15, wherein both sides of the blade taper in said tip portion to produce a finite width, whereby the tip has a wedge-shaped configuration.

20. A tool as defined in claim 15, wherein the angle between said straight portion and the major axis of said handle is between about 33° and 43°, and the angle between the major axes of said blade and said handle is about 90°.

21. A tool as defined in claim 20, wherein the angle between said straight portion and the major axis of said handle is about 38°.

* * * * *